United States Patent [19]

Balducci et al.

[11] Patent Number: 5,780,004
[45] Date of Patent: Jul. 14, 1998

[54] PROCESS FOR THE PREPARATION OF MIXED SILICA-ZIRCONIA SOLS AND MIXED OXIDES OBTAINED IN SPHERICAL FORM

[75] Inventors: Luigi Balducci, Mortara; Raffaele Ungarelli, Trecate; Fabio Garbassi, Novara, all of Italy

[73] Assignee: Enichem S.p.A., Milan, Italy

[21] Appl. No.: 672,038

[22] Filed: Jun. 26, 1996

[30] Foreign Application Priority Data

Aug. 4, 1995 [IT] Italy .................. MI95A1732

[51] Int. Cl.$^6$ .............. C01B 33/141; C01B 33/148; C01G 25/02; R01J 21/08
[52] U.S. Cl. .............. 423/326; 106/286.4; 106/287.34; 252/315.6; 423/335; 423/338; 423/608; 501/103; 502/239; 502/242
[58] Field of Search ............... 502/239, 242; 423/608, 325, 326, 335, 338; 401/103; 106/286.4, 287.34; 252/315.6

[56] References Cited

U.S. PATENT DOCUMENTS 5,292,553  3/1994  Leture et al. ............... 427/244

FOREIGN PATENT DOCUMENTS

| 0 023 587 | 2/1981  | European Pat. Off. . |
| 0 177 198 | 4/1986  | European Pat. Off. . |
| 0 391 447 | 10/1990 | European Pat. Off. . |
| 0 492 697 | 7/1992  | European Pat. Off. . |
| 0 691 305 | 1/1996  | European Pat. Off. . |

OTHER PUBLICATIONS

Chemical Abstract No. 115:141107 which is an abstract of Japanese Patent Specification No. 03-083832 (Apr. 1991).
Chemical Abstract No. 122:194943 which is an abstract of PCT International Patent Application Specification No. 94/25406 (Nov. 1994).
Chemical Abstract No. 122:36790 which is an abstract of an article by Shin et al entitled "Spinnability and rheological properties of . . . $Zr(O-n-C_3H_7)_4$ solutions" (1994) [No month].
WPIDS Abstract No. 83:767623 which is an abstract of Japanese Patent Specification No. 58-135150 (Aug. 1983).
WPIDS Abstract No. 95:174913 which is an abstract of Japanese Patent Specification No. 07-096190 (Apr. 1995).
Journal of the Ceramic Society of Japan, vol. 98, No. 6, pp. 578–582 or 48–52, XP000205225, Jun. 1, 1990, Hidehiko Kobayashi, et al., "Preparation of ZRSIO4 Powder Using Sol–Gel Process (1)–Influence of Starting Materials and Seeding".
Database WPI, Derwent Publications, AN 86–039509, JP–A 61 039 509, Feb. 25, 1986.
Patent Abstracts of Japan, vol. 10, No. 258 (C–370), AN–86–083603, Sep. 4, 1986, JP–A 61 083603, Apr. 28, 1986.

*Primary Examiner*—Anthony Green
*Attorney, Agent, or Firm*—Oblon, Spivak, McClelland, Maier & Neustadt, P.C.

[57] ABSTRACT

A process for the preparation of mixed silica-zirconia sols and mixed oxides in spherical form, comprising mixing a silicon alkoxide with a solution of an inorganic zirconium salt in a low molecular weight polyol and subjecting the intermediate thus formed to acid hydrolysis in a water medium.

10 Claims, No Drawings

PROCESS FOR THE PREPARATION OF MIXED SILICA-ZIRCONIA SOLS AND MIXED OXIDES OBTAINED IN SPHERICAL FORM

The present invention relates to a process for the preparation of mixed silica-zirconia sols and mixed oxides obtained therefrom in spherical form. These compounds can be widely used as catalysts, for example in the conversion of hydrocarbons, or as carriers for catalysts suitable for the polymerization of olefins. In particular, in this latter application, the spherical form of the particles is suitable for the catalytic processes in gas phase.

Processes for the preparation of binary mixed oxides consisting of silica and a metal oxide, (for example $Al_2O_3$, $TiO_2$, $ZrO_2$ and MgO) are the object of numerous patents in which little information is given as to the structural homogeneity of the materials and, in particular, the distribution of the metal element (Al, Ti, Zr, Mg) in the silica structure. It is known, in fact, that the traditional coprecipitation techniques of silica with the hydroxide of the metal element do not lead to the formation of mixed oxides with a homogeneous structure, as the precipitation pH of the relative hydroxides are somewhat different. This generally results in the production of products whose surface composition, measured with a surface analysis method such as, for example XPS (X-ray photoelectron spectroscopy), has considerable differences from the mass one; in particular, in the case of mixed oxides $SiO_2$—$ZrO_2$ these analyses indicate a more or less marked tendency of the Si to be present on the surface of the particles with respect to the Zr [J. Cat. 148 (1994), 673+682].

To overcome or minimize problems relating to the structural homogeneity of mixed oxides based on silica, various technological solutions have been proposed, which basically consist in controlling the reactivity of the precursors of the Si and metal element used in the preparation of the material. For example, in the preparation of mixed oxides $SiO_2$—$ZrO_2$ starting from sodium silicate as silicon precursor, compounds of Zr of the type $Na_4Zr(C_2O_4).nH_2O$ are used to avoid the premature precipitation of the Zr (U.S. Pat. No. 4,426,137; U.S. Pat. No. 4,791,08). In other processes fluozirconic acid ($H_2ZrF_6$) is used combined with fluosilicic acid ($H_2SiF_6$) thus balancing the reactivity of the Si and Zr precursors [J.Cat.148(1994).673682].

In the case of processes for the preparation of binary mixed oxides based on $SiO_2$ starting from alkoxides of Si and the metal element, the method most frequently used consists in prehydrolizing the Si alkoxide with a controlled quantity of $H_2O$; the hydroxylate precursor thus formed is subsequently interacted with the metal alkoxide. This technique, for example, is carried out in the preparation of mixed oxides $SiO_2$—$Al_2O_3$, $SiO_2$—$ZrO_2$ [J.Non-Cryst.Solids 178(1994)320] and $SiO_2$—$TiO_2$ [J.Non-Cryst.Solids 143(1992)93]. In other processes the higher reactivity of the metal alkoxide compared to that of the Si alkoxide, is slowed down with the use of complexing agents such as for example diketones as in the case of mixed oxides $SiO_2$—$TiO_2$.

Preparation techniques are also known in the art in which, the relative salts of mineral or organic acids combined with the Si alkoxide are used as precursors of the metal element; for example in the case of Zr, zirconyl nitrate is reported [J.Non-Cryst.Solids 82(1986)154] or formiate [J.Non-Cryst.Solids 159 (1993)31] or zirconium acetate.

In processes for the preparation of mixed oxides $SiO_2$—$ZrO_2$ starting from the alkoxides of Si combined with inorganic salts of Zr, it has been found that it is possible to obtain mixed precursors (sols) suitable for the synthesis of materials in spherical form, with a homogeneous structure and with controlled physico-chemical characteristics.

A first object of the present invention therefore relates to a process for the preparation of the mixed silica-zirconia sol, consisting in mixing an alkoxide of Si with a solution of an inorganic salt of Zr in polyols having a low molecular weight, and subjecting the intermediate thus formed to acid hydrolysis in a water medium.

It has been surprisingly found that the mixed sols thus prepared enable the production, with an emulsification and gelation technique of the sols and aging of the relative gels, both known in the art, of products in spherical form, with a homogeneous structure and controlled characteristics.

A further object of the present invention therefore relates to the mixed oxides obtained in spherical form from the above sols, which are characterized by specific surface values of between 300 and 800 $m^2/g$, a specific pore volume of between 0.5 and 1.5 $cm^3/g$ and a content of $ZrO_2$ of up to 30% by weight inclusive, the deviation between the surface composition, expressed as the atomic ratio Si/Zr, and that of the mass being $\leq 12\%$.

The process for the preparation of the mixed silica-zirconia sol, of the present invention, comprises the following steps:

a) dissolution of an inorganic salt of Zr in polyols with a low molecular weight;
b) mixing of the solution thus obtained with Si alkoxide;
c) acid hydrolysis of the intermediate formed in b) in a water medium with a controlled quantity of water.

In the process of the present invention, alkoxides are used as Si precursors such as for example tetramethoxysilicate [$Si(OCH_3)_4$] and, preferably, tetraethoxysilicate [$Si(OC_2H_5)_4$]. Among the precursors of Zr, zirconyl chloride or nitrate, or acid Zr sulfates can be used; it is preferable to operate with zirconyl chloride octahydrate [$ZrOCl_2.8H_2O$] as it is an inexpensive precursor widely used in the preparation of $ZrO_2$.

A fundamental part of the process for the preparation of the mixed sol is the use of polyols with a low molecular weight such as ethylene glycol, propylene glycol (diols) or glycerine; their presence in the sol in fact enables the production of mixed oxides with a more homogeneous structure than the products obtained from sol not containing these compounds.

In the process for the preparation of the mixed sol, the first phase consists in the dissolution of the Zr salt in the polyol. In the preferred embodiment, the Zr oxychloride octahydrate is combined with ethylene glycol in which it dissolves directly. In order to obtain mixed sols suitable for the preparation of spherical particles with the known emulsification and gelation processes, it is preferable to operate with molar ratios glycol/Zr varying from 70 to 80; under these conditions the dissolution of $ZrOCl_2.8H_2O$ in ethylene glycol is normally carried out at a temperature of 40°÷50° C.

The solution thus formed, is subsequently mixed with the Si alkoxide and, preferably, with tetraethoxyorthosilicate (TEOS). The operation is carried out maintaining the reagents under mechanical stirring at a temperature >100° C. to avoid the formation of intermediate products which can create problems of morphological-granulometrical control in the emulsification and gelation processes of the mixed sol. Under the conditions of the invention, the interaction between the reagents proceeds with a very limited formation of EtOH when TEOS is used as Si precursor; also operating within a temperature range of between 80° and 100° C., there are in fact no particular distillation phenomena of EtOH.

The molar ratio Zr/Si can be varied up to values equal to 0.20, thus obtaining mixed oxides based on $SiO_2$ containing up to about 30% by weight of $ZrO_2$. In the composition range having a content of Zr <10% by weight, the mixing temperature of the reagents is maintained below 90° C., whereas in the case of other compositions (Zr >10% by weight) it is preferable to operate at a temperature <50° C. with mixing times usually of more than 1 hour and preferably varying from 1 to 5 hours.

The reaction intermediate thus formed is subsequently subjected to hydrolysis by the addition of a controlled quantity of $H_2O$. This dilution causes a lowering of the reaction pH, whose value can vary from 0.5 to 2 depending on the composition of the intermediate (molar ratio Zr/Si) and degree of dilution. The quantity of $H_2O$ used in the preparation of the mixed sol is such that the molar ratio $[H_2O]/[Zr+Si]$ is $\geq 16$; under preferred conditions the molar ratios vary from 16 to 24.

The hydrolysis reaction is carried out under mechanical stirring, under controlled temperature conditions; as the reaction is exothermic, the temperature is maintained below 30° C. by external cooling of the reactor. Under the conditions of pH and temperature adopted the hydrolysis reaction times vary from 30 to 90 minutes.

The mixed sols prepared under the above conditions are characterized in that, with a basification up to pH values of between 5 and 6 by the addition of an ammoniacal solution, transparent gels are produced. On the contrary, in the case of mixed sols prepared without ethylene glycol, there is the segregation of Zr hydroxide at pH 3.

The absence of macroscopic phase segregation effects during the gelation of the mixed sols is positively reflected in the structural homogeneity of the mixed oxides obtained therefrom.

The sols of the invention can be suitably used in processes for the preparation of mixed oxides with a spherical morphology by means of the emulsification techniques known in the art. In particular, the process followed to illustrate the present invention is described in patent EP 653378 and Italian patent application MI 95A001139. This process consists in emulsifying the mixed sol in a dispersing medium (decanol), in consolidating (gelling) the emulsion thus formed by contact with an alkaline solution and subjecting the gel thus obtained to thermal aging in the presence of the emulsifying liquid and gelation base of the sol or in a water medium under controlled conditions of pH and temperature.

As an alternative to the method described above, other known techniques have been followed, such as that described in U.S. Pat. No. 5,270,027 and consisting in emulsifying the mixed sol suitably prebasified to a certain pH, in aliphatic or aromatic hydrocarbons; in this emulsification process, the consolidation of the microdrops of the sol proceeds gradually in the emulsifying medium.

The mixed oxides obtained in spherical form from the sols of the present invention are characterized in that the surface atomic concentrations of the elements (Si, Zr), measured with a surface analysis method such as XPS (X-ray photoelectron spectroscopy), do not differ greatly from those of the mass calculated from chemical analyses. Indicating $(Si/Zr)_s$ as the ratio between the surface concentrations of the elements Si and Zr and $(Si/Zr)_b$ as that of the mass, the deviation $D=[(Si/Zr)_s-(Si/Zr)_b]$ was 12% in the whole range of $SiO_2$—$ZrO_2$ compositions of the invention. Consequently the tendency of the silicon to be situated on the surface of the particles with respect to the Zr is very limited and is considerably lower than that observed in analogous mixed oxides prepared with other methods known in the art [J.Cat.148(1994) 673682]. As a confirmation of the structural homogeneity, the mixed oxides of the invention are characterized in that they conserve their amorphous structure up to a temperature of 750° C.; in the case of compositions with a Zr content <18% by weight, the diffractometric analyses do not show phase segregations up to 900° C. At this temperature instead there is an incipient crystallization of the $ZrO_2$ in the tetragonal structure in the case of mixed oxides with a Zr content $\geq 18\%$; the degree of crystallization, intended as dimensions of the $ZrO_2$ crystals, is kept however to very low values and this suggests a homogeneous distribution of the $ZrO_2$ in the silica structure.

With respect to the other properties, the mixed oxides obtained in spherical form from the sols of the invention, are characterized by a content of $ZrO_2$ of up to 30% by weight inclusive, specific surface values of between 300 and 800 $m_2/g$ and a specific pore volume of between 0.5 and 1.5 $cm^3/g$.

To evaluate the characteristics of the mixed oxides obtained according to the present invention, the products were calcinated at 550° C. for 10 hours with a heating rate of 50° C./h.

The mixed oxides of the invention are hereafter described in terms of average particle diameter ($D_{50}$), specific pore volume (Vp), surface area (S.S.), average pore diameter (dp), and surface composition (atomic ratio Si/Zr).

The average particle dimension was measured by a Malvern Serie 2600C analyzer (Malvern Instruments, England) and expressed in terms of median diameter, $D_{50}$, corresponding to the diameter with the ordinate at 50% in the granulometric distribution curve in a cumulative form.

The surface area was determined with the B.E.T. method (Brunauer, Emmett and Teller); the specific pore volume with the Dollimore-Heal method, both known in the art.

The average pore diameter, expressed in Å, was calculated by the following known relation:

$$dp(Å)=[4\ Vp(cm^3/g)/S.S.(m^2/g)]\cdot 10^4$$

The surface composition of the mixed oxides was determined by XPS analysis (X-ray photoelectron spectroscopy), carried out on the sample in powder form using apparatus described in other works [Appl.Surfac. Science 84(1995), 145]. The surface atomic concentrations of the elements were obtained from the intensities of the photoemission peaks of the Zr and Si with the methods known in the art [J. F. Moulder, W. F. Stickle, P. E. Sobol, K. D. Bomben, "Handbook of X-ray Photoelectron Spectroscopy", Perkin-Elmer Corp. Physical Electronics Div., Eden Prairie, Minn., 1992]. The surface characteristics of the mixed oxides are hereinafter expressed as % deviation (D) between the surface composition and that of the mass calculated by means of the following relation:

$$D=\frac{(Si/Zr)\delta - (Si/Zr)_b}{(Si/Zr)_b}\cdot 100$$

wherein $(Si/Zr)\delta$ is the atomic ratio between the elements determined by XPS and $(Si/Zr)_b$ is that calculated from the chemical anlayses of the mixed oxide.

The following experimental examples are purely illustrative and do not limit the scope of the present invention.

EXAMPLE 1

A) Preparation of the Mixed Silica-zirconia Sol 35.7 g of $ZrOCl_2\cdot 8H_2O$ [C.Erba Analyticals; titer of Zr=25%; equal to 0.1 moles] and 472 g of ethylene glycol

[C.Erba Analyticals; titer 99.5% equal to 7.6 moles]; are charged into a 3 liter cylindrical reactor, equipped with a stirrer and external thermostat-regulated heating/cooling bath; the reagents, maintained under stirring, are gradually heated until the complete dissolution of the Zr salt (final temperature=45° C.). 520 g of tetraethoxyorthosilicate $Si(OC_2H_5)_4$ [Aldrich, titer 99%; equal to 2 moles] are then added and the mixture is gradually heated under stirring to 80° C. The reaction mixture is maintained under stirring at this temperature for a further 3 hours. After cooling to 30° C., 590 ml of demineralized $H_2O$ are added so that the temperature of the reaction mass does not exceed 30° C. At the end of the addition the mixed sol is maintained under mechanical stirring for a further hour with a temperature of 25° C. Final volume of the sol=1450 ml; molar ratio $[H_2O]/[Si+Zr]=16$; pH=1.3 at 25° C.

B) Preparation of the Mixed Oxide

The preparation of the mixed oxide was carried out with the process and equipment described in Example 1 of patent EP 653378 and patent application MI 95A001139, relating respectively to the preparation of silica and mixed silica-alumina oxides with a spherical morphology.

Emulsification and Gelation of the Mixed Sol

The operation is carried out in a 1 liter laboratory reactor equipped with temperature regulation by means of a thermocryostat, pressurization system with nitrogen, propeller mechanical stirring with 6 radial blades activated by a motovariator with controlled rate, internal plunged pipe with an internal diameter of 5 mm and inlet for the charging of the reagents and vent. The plunged pipe is connected, by means of a ball valve, to the emulsifying pipe (internal diameter 3.1 mm and length 500 cm) and outlet of the emulsion into the 1 liter, glass cylindrical reactor (internal diameter 100 mm) equipped with a propeller stirrer with 6 radial slanting blades and controlled velocity. 150 ml of mixed sol (prepared as described in A) and 450 ml of 1-decanol (Fluka) are charged into the mixing reactor; the reactor is thermostat-regulated at 20° C. maintaining the mixture under stirring (300 rpm) for 5 min. The reactor is then pressurized at 2.8 bars with nitrogen and the pre-emulsion is discharged, by means of the special ball valve and through the emulsifying pipe, into the gelation bath of the sol consisting of a solution of cyclohexylamine (15 ml) in 1-decanol (150 ml) maintained under stirring (300 rpm) at a temperature of 20° C. 500 ml of emulsion are discharged into the gelation reactor in 51 sec.; the linear flow rate of the emulsion in the pipe is equal to 1.32 m/sec. The silica-zirconia gel thus obtained is maintained under stirring for 1 hour; it is subsequently left to decant and the clear product is siphoned until a densified solid product is obtained at about 80 g/l expressed as $(SiO_2+ZrO_2)$.

Aging and Calcination of the Gel

The gel densified in its mother liquor, as obtained in B), is transferred to a glass container equipped with a special hermetically closed tap, then immersed in a thermostatic bath and heated to 95° C.; the heating is continued for 4 hours (final pH of the turbid product at 20° C.=9.5). After cooling, the product is filtered, washed with absolute ethyl alcohol, dried at reduced pressure (0.1 bars) and finally calcinated in the air at a temperature of 550° C. for 10 hours, regulating the heating rate at 50° C./h. The mixed oxide with spherical morphology thus obtained, proved to consist of particles with an average diameter $(D_{50})=30$ m and has the following characteristics: content of $ZrO_2=7.36\%$; S.S.=670 m²/g; Vp=0.88 cm³/g; dp=53 Å. The structure of the material calcinated at 550° C. is amorphous; this structure is conserved up to 900° C. From XPS and chemical analyses, the deviation $$D = \frac{(Si/Zr)_s - (Si/Zr)_b}{(Si/Zr)_b} \cdot 100$$

is equal to 10%.

EXAMPLE 2

Example 1 is repeated varying the mixing temperature of the solution of zirconyl chloride in ethylene glycol with tetraethoxyorthosilicate. This operation is carried out at 30° C. for 3 hours. The same procedure is then adopted as in Example 1. The mixed oxide obtained consists of spherical particles with an average diameter $D_{50}=27$ m and has the following characteristics:

content of $ZrO_2=7.4\%$; S.S.=663 m²/g; Vp=0.8 cm³/g; dp=48 Å. The structure of the material calcinated at 550° C. is amorphous; this structure is conserved up to 900° C. From XPS and chemical analyses the deviation D between the composition of the surface and that of the mass is equal to 10%.

EXAMPLES 3–4

Example 2 is repeated, varying the composition of the mixed sol (molar ratio Zr/Si). The results obtained are shown in TAB.1

TABLE 1

| Ex. | Composition of the sol (Zr/Si) | $D_{50}$ (m) | S. S. (m²/g) | Vp (cm³/g) | dp (Å) | $ZrO_2$ (%) | D (%) |
|---|---|---|---|---|---|---|---|
| 3 | 0.015 | 32 | 700 | 1.12 | 64 | 2.36 | 12.0 |
| 4 | 0.150 | 28 | 506 | 0.54 | 43 | 17.40 | 1.4 |

The structure of the materials calcinated at 550° C. is amorphous; diffractometric analyses carried out on the sample with a higher content of Zr (Ex.4) calcinated at 900° C. show an incipient crystallization of the $ZrO_2$ in the tetragonal structure.

The deviation D between the composition of the surface and that of the mass of materials tends to decrease with an increase in the content of $ZrO_2$ and in any case is less than 12%.

EXAMPLES 5–6–7

With respect to examples 2, 3, 4 the aging conditions of the gels are varied. This operation is carried out in a water medium at acid pH (pH=4.5). At the end of the gelation of the sol carried out under the conditions of Examples 2, 3, 4 the gel is filtered; the filtration panel is subsequently redispersed in $H_2O$ (about 80 g/l as oxides) and the pH of the turbid product is then corrected to 4.5 by the addition of $HNO_3$ (for example in a water solution at 10% by weight). The aging of the gel at this pH is carried out at 95° C. for 4 hours. At the end, the same procedure is used as in Example 1. The results obtained are shown in TAB-2

TABLE 2

| Ex. | Composition of the sol (Zr/Si) | $D_{50}$ (m) | S. S. ($m^2/g$) | Vp ($cm^3/g$) | dp (Å) | $ZrO_2$ (%) |
|---|---|---|---|---|---|---|
| 5 | 0.015 | 30 | 667 | 0.93 | 56 | 2.36 |
| 6 | 0.050 | 25 | 817 | 0.75 | 37 | 7.41 |
| 7 | 0.150 | 27 | 467 | 0.50 | 43 | 18.30 |

Also the aging of the gels in a water medium and at acid pH allows products with a high surface area to be obtained.

EXAMPLES 8–9–10

With respect to Examples 5, 6, 7, the aging of the gels is carried out in a water medium at basic pH (pH 8). The water dispersion of the gel prepared as in Examples 5, 6, 7, is basified up to pH 8 by the addition of an ammonia solution. The aging of the gel at this pH is carried out at 95° C. for 4 hours. At the end the same procedure is used as in Example 1. The results obtained are shown in TAB-3

TABLE 3

| Ex. | Composition of the sol (Zr/Si) | S. S. ($m^2/g$) | Vp ($cm^3/g$) | dp (Å) | $ZrO_2$ (%) |
|---|---|---|---|---|---|
| 8 | 0.015 | 610 | 1.09 | 71 | 2.36 |
| 9 | 0.050 | 715 | 0.89 | 50 | 7.41 |
| 10 | 0.150 | 473 | 0.78 | 66 | 17.60 |

Comparing the aging of the gels in an acid medium (Ex. 5, 6 7), the alkaline medium gives products which generally have a higher porosity with respect to both the specific volume and average pore diameter.

EXAMPLE 11

With respect to Example 1 the emulsification and gelation method of the sol is varied and, in this example, is analogous to that described in U.S. Pat. No. 5,270,027 (Ex.1) relating to the preparation of silica hydrogels.

170 ml of the mixed sol of Example 1 (A), maintained under mechanical stirring at a temperature of 25° C., is gradually basified to pH 6.0 by the addition of a 1M solution of $NH_4OH$. The sol thus prebasified is rapidly charged into a 1 liter reactor, into which 600 ml of a hexane solution of Span 80 (8.8 g of sorbitan monooleate) have been previously fed, under stirring at 500 rpm by means of a mechanical propeller stirrer with 6 radial blades. The emulsion thus formed consists of drops of sol which, after about 20 minutes are transformed into spherical particles of gel. The product is maintained under mechanical stirring for a further 20 minutes and is then filtered and washed on a filter with decane. The filtration panel is subsequently dispersed in decane; the dispersion thus obtained is subjected to thermal treatment at 110° C. for 4 hours. The product is then filtered with subsequent washing in ethanol, water and again ethanol. The gel is finally dried and calcinated under the conditions described in Ex.1.

The mixed oxide obtained consists of spherical particles with an average diameter $D_{50}$=36 m and has the following characteristics: content of $ZrO_2$=7.2%; S.S.=790 $m^2/g$; Vp=1.2 $cm^3/g$; dp=61 Å. The deviation D between the composition of the surface and that of the mass is about 9%.

COMPARATIVE EXAMPLES

A series of comparative examples are provided below which refer to products prepared from different sols from those of the present invention. In the following examples tetraethoxyorthosilicate and zirconyl chloride octahydrate are used as precursors of Si and Zr respectively.

EXAMPLE 12

45.6 g of $ZrOCl_2.8H_2O$ are dissolved in 1050 ml of a hydroalcoholic solution (at 47.9% in volume of EtOH); 683 ml of TEOS are added, maintaining the solution under stirring, the temperature being regulated, with an external cooling bath, so that it does not exceed 30° C. The limpid solution is maintained under stirring for 1 hour. At the end of the reaction, to avoid problems of emulsification of the sol in decanol, the ethyl alcohol is partially evaporated at reduced pressure (500 mbars; 22°–25° C.) until a residual volume of about 1600 ml, equal to 1547 g, is obtained.

For the production of the mixed oxide, the conditions described in Example 1 are followed.

The product proves to consist of spherical particles with an average diameter of about 36 m and has the following characteristics: content of $ZrO_2$=7.54%; S.S.=662 $m^2/g$; Vp=0.65 $cm^3/g$; dp=39 Å. XPS analyses showed a surface enrichment of Si (D=20%) considerably higher than that of the sample of Example 1 having the same composition.

EXAMPLE 13

With respect to Example 12 a sol of Zr hydroxide prepared by the thermal hydrolysis of zirconyl oxychloride, is used.

411 g of $ZrOCl_2.8H_2O$ and 2 liters of demineralized $H_2O$ are charged into a 3 liter spherical reactor, equipped with a stirrer, a reflux condenser and heating jacket. The water solution is heated under mechanical stirring to boiling point (about 100° C.); after being left in these conditions for 46 hours, the solution becomes slightly opalescent after hydrolysis of the zirconyl chloride [J. Colloid Interface Sci. 31(1970)238].

240 ml of the solution thus prepared are diluted with 520 ml of demineralized $H_2O$; 570 ml of TEOS are then added the reaction temperature being maintained below 40° C. by external cooling. The system, initially biphasic, becomes monophasic after about 15 min.; the colloidal solution at pH 1.2 is maintained under stirring for a further hour at a temperature of about 25° C. The mixed sol thus prepared is used for the preparation of the mixed oxide operating under the conditions described in Example 1.

The product obtained proves to consist of spherical particles with an average diameter of 40 m and has the following characteristics: content of $ZrO_2$=7.2%; S.S.=482 $m^2/g$; Vp=1.16 $cm^3/g$; dp=96 Å. XPS analyses showed a strong surface enrichment of Si (D=28%) considerably higher than that of the sample of Example 1.

EXAMPLE 14

Example 13 is repeated varying the composition of the mixed sol (molar ratio Zr/Si=0.015).

The product obtained proves to consist of spherical particles with an average diameter of 38 m and has the following characteristics: content of $ZrO_2$=2.28%; S.S.=488 $m^2/g$; Vp=1.17 $cm^3/g$; dp=96 Å. Also in this case the XPS analyses showed a strong surface enrichment of Si (D=39%) compared to that of the sample of Example 3 having an analogous composition.

We claim:

1. A process for preparation of a mixed silica-zirconia sol comprising mixing a silicon alkoxide with a solution of an inorganic salt of zirconium in at least one polyol, wherein said polyol is selected from the group consisting of ethylene glycol, propylene glycol and glycerin, to form an intermediate, and then subjecting said intermediate to acid hydrolysis in a water medium.

2. The process of claim 1, additionally comprising subjecting said mixed silica-zirconia sol to an emulsification process followed by a gelation process, wherein a mixed silica-zirconia gel is formed.

3. The process of claim 2, additionally comprising subjecting said gel to thermal aging followed by calcination.

4. The process of claim 1, wherein said acid hydrolysis in a water medium is carried out with a quantity of water such that the molar ratio: $(H_2O)/(Zr+Si)$ is $\geq 16$.

5. The process of claim 1, wherein the silicon alkoxide is $Si(OCH_3)_4$ or $Si(OC_2H_5)_4$.

6. The process of claim 1, wherein the inorganic salt of zirconium is zirconyl chloride, zirconyl nitrate, or zirconyl acid sulfate.

7. The process of claim 6, wherein the inorganic salt of zirconium is zirconyl chloride octahydrate.

8. A mixed oxide of silica and zirconia in spherical form and having a homogeneous structure, wherein said mixed oxide has a specific surface of between 300 and 800 m²/g, a specific weight volume of between 0.5 and 1.5 cm³/g, and a maximum content of zirconia of 30% by weight of the mixed oxide.

9. The mixed oxide of claim 8, prepared from a silica-zirconia sol obtained by a process comprising mixing a silicon alkoxide with a solution of an organic salt of zirconium in at least one polyol, wherein said polyol is selected from the group consisting of ethylene glycol, propylene glycol and glycerin, to form an intermediate, and then subjecting said intermediate to acid hydrolysis in a water medium.

10. The mixed oxide of claim 8, prepared by a process comprising mixing a silicon alkoxide with a solution of an organic salt of zirconium in at least one polyol, wherein said polyol is selected from the group consisting of ethylene glycol, propylene glycol and glycerin, to form an intermediate, and then subjecting said intermediate to acid hydrolysis in a water medium, to form a mixed silica-zirconia sol, followed by subjecting said mixed silica-zirconia sol to an emulsification process followed by a gelation process, wherein a mixed silica-zirconia gel is formed, followed by subjecting said gel to thermal aging followed by calcination.

* * * * *